United States Patent [19]

Leksell et al.

[11] Patent Number: 4,928,118
[45] Date of Patent: May 22, 1990

[54] ENHANCED RESOLUTION ELECTROPHOTOGRAPHIC-TYPE IMAGING STATION

[75] Inventors: David Leksell, Oakmont; Zoltan K. Kun, Churchill Boro; Alan F. Mandel, Mt. Lebanon, all of Pa.

[73] Assignee: Westinghouse Electric Corp., Pittsburgh, Pa.

[21] Appl. No.: 281,111

[22] Filed: Dec. 7, 1988

[51] Int. Cl.⁵ ............................................. G01D 15/14
[52] U.S. Cl. .................................. 346/107 R; 358/296; 346/1.1
[58] Field of Search ................... 346/107 R, 108, 160, 346/76 L; 358/296, 300, 302

[56] References Cited

U.S. PATENT DOCUMENTS

| | | |
|---|---|---|
| 3,952,311 | 4/1976 | Lapeyre . |
| 4,357,619 | 11/1982 | Klockenbrink . |
| 4,437,106 | 3/1984 | Sprague . |
| 4,506,275 | 3/1985 | Maeda . |
| 4,543,613 | 9/1985 | Sakamoto . |
| 4,553,148 | 11/1985 | Behrens et al. . |
| 4,593,297 | 6/1986 | Suzuki et al. . |
| 4,693,548 | 9/1987 | Tsunoi . |
| 4,764,776 | 8/1988 | Mugrauer ............................ 346/108 |

Primary Examiner—Bruce A. Reynolds
Assistant Examiner—Mark Reinhart
Attorney, Agent, or Firm—J. K. Williamson

[57] ABSTRACT

An electrophotographic-type imaging station or printer includes a focusing lens positioned between the printer light source and a photosensitive medium. As the light source projects beams of light energy forming a row in a direction towards the photosensitive medium, the lens focuses each projected beam into a rectangular beam. The speed of the photosensitive medium and the operation of the light source are coordinated so that adjacent rows of generally rectangular beams are positioned in abutting relation with each other. The plurality of focused rows projected in row-at-a-time fashion onto the surface of the photosensitive medium form an informational array pattern having a resolution in a direction parallel with the direction of medium movement which is greater than the resolution of the pattern in a direction perpendicular to the direction of medium movement. By forming an informational array pattern in this manner, a desired informational array pattern gray scale may be achieved without a loss in the original resolution of the array pattern taken in a direction perpendicular to the direction of medium movement.

15 Claims, 4 Drawing Sheets

ENHANCED RESOLUTION ELECTROPHOTOGRAPHIC-TYPE IMAGING STATION

BACKGROUND OF THE INVENTION

1. Field of the Invention

This invention relates generally to an electrophotographic-type imaging station, and more particularly, to an electrophotographic-type imaging station capable of producing an informational array pattern of enhanced resolution on a photosensitive medium.

2. Background Information

Electrophotographic-type imaging stations or printers operable to record information such as images or indicia on a photosensitive medium are well known. These imaging stations convert electrical signals to beams of light energy of varying intensities which are projected onto the surface of the photosensitive medium. The projected beams form an informational array pattern defined by the beams on the medium surface. Depending upon the type of photosensitive medium utilized, the informational array pattern representative of the image or indicia is either permanently fixed on the photosensitive medium through a photodevelopment process or transferred onto a recording medium which is brought into contact with the informational array pattern within the imaging station.

For example, one type of electrophotographic imaging station or printer utilizes a photosensitive medium in the form of a photoreceptor which is coated on a rotating drum designed to accept and hold a uniform electrostatic charge. After the uniformly charged surface of the photoreceptor is illuminated by light from an optical source to form an informational array pattern thereon which defines an image or indicia, the array pattern is developed by attracting toner particles. The amount of toner attraction varies with the intensity of the light projected from the optical source, and the array pattern is formed according to the differences in the toner density. Printing is completed by transferring this array pattern onto a recording medium such as paper by bringing the paper into contact with the photoreceptor.

Other known imaging stations or printers are operable to permanently record images or indicia directly on the surface of the photosensitive medium. These devices utilize a photosensitive medium in the form of an image-recording sheet of photosensitive paper which is passed in proximity to a light source. The surface of the paper is illuminated by beams of light energy projected from the source to form an informational array pattern which defines the image or indicia to be recorded. The beams of light energy develop the photosensitive paper to form the desired image or indicia.

With each of the imaging stations or printers described above, a light source in the form or either a laser scanner, a light-emitting diode array or a combination light source/liquid crystal shutter cell assembly is generally utilized. Both the diode array and the light source/liquid crystal shutter cell assembly project a linear array of beams of light energy towards the surface of the moving photosensitive medium so that recording on the medium is done in row-at-a-time fashion. With the laser scanner, a single beam of light energy projected towards the moving medium is reflected by a rotating prism-type assembly so that recording on the medium is done in dot-at-a-time, row-at-a-time fashion. Since each of the above-mentioned light sources projects either an array of generally roundish or square beams of light energy to form each projected row, or a generally roundish dot of light energy in the case of a laser scanner, the resolution of the projected informational array pattern taken in a direction perpendicular to each projected row is the same as the resolution of each row. Thus, the resolution of the informational array pattern is symmetrical in that the resolution of the pattern is the same in the directions both parallel with and perpendicular to the direction of movement of the photosensitive medium.

Since the resolution of the informational array pattern projected by conventional electrophotographic-type imaging stations or printers is symmetrical, it is extremely difficult to vary the gray scale of the array pattern without incurring a loss of array pattern resolution. With the imaging stations or printers of the prior art, an array pattern of desired gray scale is formed by dividing the pattern into a plurality of picture elements (PEL) each containing several individually addressable locations, and selecting the number of "on" or actually addressed locations in each PEL. For example, an informational array pattern having a resolution of three hundred (300) dots per inch (dpi) in directions both parallel with and perpendicular to the direction of movement of the photosensitive medium may be divided into a plurality of 4×4 PELs each containing sixteen individually addressable locations. By varying the total number of individually addressable locations in each PEL actually addressed, the gray scale of the informational array pattern may be varied incrementally from between 0 and 100%. However, by forming each PEL in 4×4 matrix form, the resolution of the array pattern in directions both parallel with and perpendicular to the direction of movement of the photosensitive medium is reduced from 300 dpi to 300/4=75 dpi.

The loss of resolution to achieve desired gray scale is unacceptable in many printing applications, and therefore there is a need for an improved electrophotographic-type imaging station or printer capable of projecting an informational array pattern onto the surface of a photosensitive medium which overcomes these shortcomings. Specifically, the improved imaging station or printer must be capable of projecting an array pattern having a resolution in a direction parallel with the direction of photosensitive medium movement which is greater than the resolution of the array pattern in a direction perpendicular to the direction of movement of the medium. Projecting an informational array pattern in this manner will permit a desired pattern gray scale to be achieved without a loss in the original resolution of the pattern taken in the direction perpendicular to the direction of medium movement.

SUMMARY OF THE INVENTION

In accordance with the present invention, there is provided an improved imaging station or printer for producing an informational array pattern of enhanced resolution on the surface of a photosensitive medium which includes a photosensitive medium having mutually orthogonal first and second axes. A light source is spaced from the photosensitive medium, the light source being capable of projecting a preselected number of beams of light energy along generally linear paths defining a row substantially parallel with the medium first axis. Each beam has a preselected cross-sectional configuration with mutually orthogonal first and second axes. The light source projects each beam of light energy in a direction towards an individually addressable location on the photosensitive medium so that each beam first and second cross-sectional axes are substantially parallel with the medium first and second axes, respectively.

A lens is interposed between the photosensitive medium and the light source, the lens focusing each preselected cross-section beam in a row to a generally rectangular beam of light energy. Each rectangular beam has a first cross-sectional axis substantially identical in length to the length of the first cross-sectional axis of the projected beam and a second cross-sectional axis whose length is reduced as a preselected percentage of the length of the projected beam second cross-sectional axis. The rectangular beam first cross-sectional axis is greater in length than the rectangular beam second cross-sectional axis.

A drive mechanism for moving the photosensitive medium relative to the light source in a direction substantially parallel with the medium second axis is provided, and the activation of the light source and the movement of the photosensitive medium are coordinated so that an informational array pattern including a plurality of rows of generally rectangular dots is formed in row-at-a-time, abutting fashion on the surface of the photosensitive medium. The informational array pattern forms an N×M matrix wherein the value N corresponds to the total number of individually addressable locations in a preselected length of a given row onto which the rectangular beams of light energy may be projected and measured in a direction parallel with the medium first axis. The value M corresponds to the total number of rows of rectangular beams of light energy capable of being projected over the same preselected length measured in a direction parallel with the medium second axis.

The value N defines the resolution of the informational array pattern in a direction parallel with the medium first axis and the value M defines the resolution of the informational array pattern in a direction parallel with the medium second axis. The resolution in the direction parallel with the medium first axis is greater than the resolution in the direction parallel with the medium second axis.

Further in accordance with the present invention, there is provided a method for producing an informational array pattern of enhanced resolution on the surface of a photosensitive medium which includes the steps of providing a photosensitive medium having mutually orthogonal first and second axes, and positioning a light source a preselected distance from the photosensitive medium. The light source is capable of projecting a linear array of beams of light energy along generally linear paths defining a row towards individually addressable locations on the photosensitive medium, each beam having a preselected cross-sectional configuration with mutually orthogonal first and second axes. The light source is positioned relative to the photosensitive medium so that the linear array of projected beams and the first cross-sectional axis of each beam in the array are substantially parallel with the medium first axis. The method includes the step of focusing each projected beam into a beam having a generally rectangular cross-sectional configuration. Each focused beam has a first cross-sectional axis substantially identical in length to the length of the projected beam first cross-sectional axis, and a second cross-sectional axis having a length reduced as a percentage of the length of the projected beam second cross-sectional axis.

The method includes the further steps of moving the photosensitive medium relative to the light source in a direction substantially parallel with the medium second axis, and coordinating the movement of the photosensitive medium and the activation of the light source so that an informational array pattern including a plurality of rows of generally rectangular dots is formed in row-at-a-time, abutting fashion on the surface of the photosensitive medium.

The informational array pattern forms an N×M matrix wherein the value N corresponds to the total number of individually addressable locations in a preselected length of a given row onto which the rectangular beams may be projected measured in a direction parallel with the medium first axis, and the value M corresponds to the total number of rows of rectangular beams capable of being projected over the same preselected length measured in a direction parallel with the medium second axis. The value N defines the resolution of the array pattern in the direction parallel with the medium first axis and the value M defines the resolution of the array pattern in the direction parallel with the medium second axis.

BRIEF DESCRIPTION OF THE DRAWINGS

The above as well as other features and advantages of the present invention will become apparent through consideration of the detailed description in connection with the accompanying drawings in which.

DESCRIPTION OF THE PREFERRED EMBODIMENTS

Figure 1A:
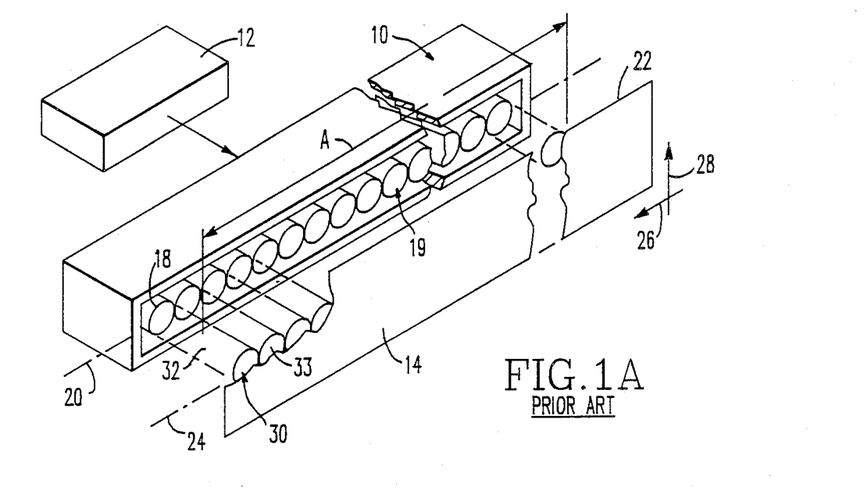
FIG. 1A illustrates in perspective the light source of an electrophotographic-type printer of the prior art projecting a plurality of individual beams of light energy forming a row onto the surface of a photosensitive medium such as paper.

Referring to the drawings and particularly to FIG. 1A, there is illustrated in perspective a light source or head 10 having a processor 12 electrically connected therewith and spaced from a photosensitive medium 14. As known in the art, both light source 10 and processor 12 are components of a conventional electrophotographic-type imaging station or printer. Since both the construction and operation of prior art electrophotographic-type printers are well known, and additionally for the sake of clarity, those components not essential for an understanding of the conventional printer have been omitted from FIG. 1A. It should be understood that although the following discussion, both with regard to the prior art and the present invention itself, will be based on the use of a light source formed from a plurality of individual light-emitting diodes, other types of light sources may be utilized with similar results. Thus, nothing herein is intended to limit the scope of the invention to the use of a diode array light source. In addition, any of the conventional light sources which may be utilized is considered capable of projecting a plurality of beams of light energy forming a linear array or row of beams, with consecutive rows being projected in row-at-a-time fashion onto the surface of a photosensitive medium.

Light source or head 10 of the electrophotographic-type printer of the prior art is spaced a preselected distance from photosensitive medium 14, and positioned within the printer housing (not shown) so that the plurality of individual light sources 18 of head 10 form a linear array 19 which lies along an axis illustrated at 20. Each of the individual light sources 18 is a light-emitting diode capable of projecting, upon actuation, a generally circular cross-sectional beam of light energy towards the surface 22 of photosensitive medium 14. It should be understood that although photosensitive medium 14 is illustrated in FIG. 1A as a sheet of photosensitive paper material, any type of photosensitive medium maybe utilized. This point will be further illustrated and described herein. As previously stated, although light source 10 is illustrated and described herein as a linear array of individually addressable light-emitting diodes, it is well known to those skilled in the art that other types of light sources such as laser printing heads or scanners, or liquid-crystal shutter cell assemblies may also be utilized.

Processor 12, which is electrically connected with light source 10, is operable to provide an excitation signal to each light emitting diode 18 in the array. The receipt of a suitable excitation signal by an individual light-emitting diode 18 causes the diode to radiate light energy towards an individually addressable location on the surface 22 of photosensitive paper 14. Since all the diodes 18 in diode array 19 lie along axis 20, it is apparent that light projected by the diodes will lie along an axis 24 on medium 14 parallel with axis 20. This feature permits light source 10 to project a plurality of rows of individual light beams in row-at-a-time fashion onto the surface 22 of photosensitive paper 14 as paper 14 is moved relative thereto. Each projected beam contacting the surface of the photosensitive paper causes a darkening of the paper at that particular individually addressable location via known photo-development techniques.

Photosensitive paper 14, which is spaced from array 19, may be considered as having a pair of first and second mutually orthogonal axes 26, 28. Paper first axis 26 is parallel with both diode array axis 20 and the axis 24 along which each of the projected beams contacts the surface 22 of paper 14. Photosensitive paper 14 travels in a direction parallel with second axis 28 as rows 30 of light beams 32 (a portion of one row shown) are projected in row-at-a-time fashion onto the paper surface. A preselected number of rows 30 of individual dots 33 are projected onto surface 22 forming an informational array pattern, the total number of rows dependent upon the image or alphanumeric character to be formed. As known in the art, the number of diodes 18 actually projecting a beam of light energy in each row is also dependent upon the formed image or alphanumeric character. In addition, although not specifically illustrated in FIG. 1A for the sake of clarity, adjacent formed dots 33 will overlap each other on medium 14 surface 22.

Figure 1B:
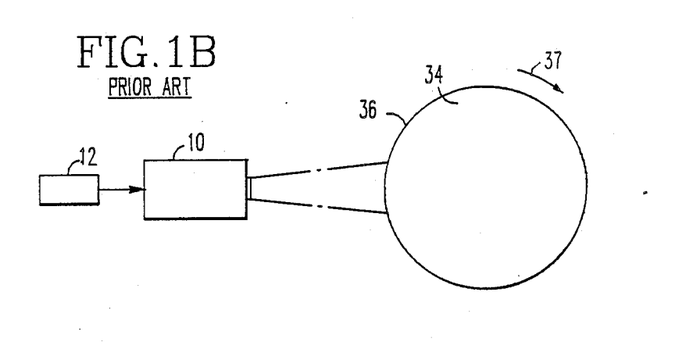
FIG. 1B schematically illustrates the light source of a prior art electrophotographic-type printer projecting a beam of light energy onto the surface of a photoreceptor coated on a rotating drum.

Now referring to FIG. 1B, there is schematically illustrated the light source 10 and processor 12 previously described. However, as seen in FIG. 1B, light source 10 is spaced in this case from a drum 34 having a coating of photoreceptor 36 thereon. The use of a drum/photoreceptor combination in electrophotographic-type imaging stations or printers is also well known. For the sake of clarity, components such as the drum charging device, developing device and transfer device are eliminated from FIG. 1B.

As seen in FIG. 1B, drum 34 having the photoreceptor coating 36 thereon is adapted for rotation at a substantially constant speed in a direction indicated by the arrow 37. As the photoreceptor 36 passes over a drum charging device (not shown), it is uniformly electrified with electrostatic charges which build up on photoreceptor 36 as a result of corona discharge. Uniformly charged photoreceptor 36 is illuminated by light source 10 in a manner previously described with reference to FIG. 1A so that rows of beams of light energy are projected onto the photoreceptor in row-at-a-time fashion. The charge on the photoreceptor surface is lost when it is exposed to light, the degree of charge lost depending upon the amount of exposure. An informational array pattern is formed on the surface of the photoreceptor according to the densities of the residual charges at each of the individually addressable locations in the informational array pattern.

After the informational array pattern is formed on the photoreceptor, the photoreceptor passes in proximity to a developing device (also not shown) and a density pattern is formed according to the amount of toner which is attracted by the residual charges held on the photoreceptor at each individually addressable location in the array pattern. This toner pattern is then transferred onto a recording medium such as a sheet of recording paper under an electric field applied from a transfer device (paper and transfer device not shown) in order to complete the image or indicia-forming process.

Figure 1C:
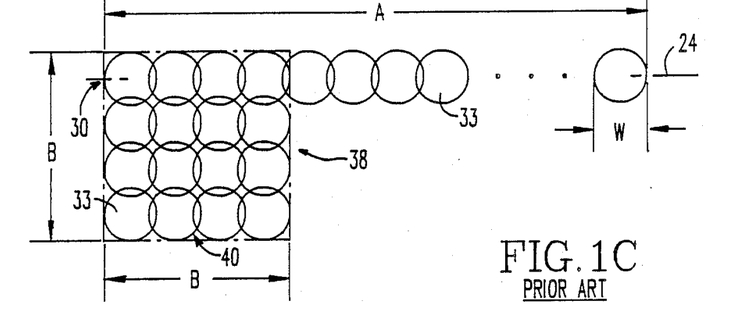
FIG. 1C illustrates the type of informational array pattern projected onto the surface of a photosensitive medium by a typical electrophotographic-type printer of the prior art to achieve 100% gray scale.

For a better understanding of the type of informational array pattern formed on the surface of a photosensitive medium by electrophotographic-type imaging stations of the prior art, reference is now made to FIG. 1C. It should be understood that the informational array pattern illustrated in FIG. 1C may be formed utilizing the electrophotographic-type imaging stations illustrated in either FIG. 1A or FIG. 1B.

Referring to FIG. 1C, there is illustrated a single row 30 of generally circular or roundish dots of light energy schematically represented by the numerals 33 spanning a length designated by the letter A. Each dot 33 has a generally circular or roundish cross-sectional configuration. As known in the art, the maximum number of individual dots 33 capable of being included in a single row 30 is dependent upon the total number of individual light emitting diodes 18 in array 19. As seen in FIG. 1A, the total number of diodes capable of being included in array 19 is dependent upon the size of each diode and the working length A of the source.

For example, if light source 10 illustrated in FIGS. 1A and 1B includes 300 individual diodes 18 over a length A, and A=1 inch, then light source 10 is capable of projecting a maximum of 300 individual beams of light energy per inch towards the surface 22 of photosensitive paper 14 or photoreceptor 36. As a result, a maximum of 300 dots of light energy 33 are capable of being projected onto the surface of the paper or photoreceptor over a length of one inch. Each of the projected dots 33 in a single row 30 would lie on an axis 24 which is parallel with medium first axis 26 and perpendicular to medium second axis 28.

It is apparent that if each row 30 includes 300 individual dots over a length of one inch, the resolution of row 30 is 300 dots per inch (dpi). Since row 30 lies on axis 24 which is parallel with the first axis 26 of medium 14, then the resolution of row 30 defines the resolution of the informational array pattern in a direction parallel with first axis 26. Thus, the plurality of rows formed in row-at-a-time fashion by light source 10 will each have a resolution of 300 dpi in a direction parallel with medium first axis 26. Further, since each dot 33 has a generally circular or roundish cross-sectional configuration illustrated by the letter W, it is also apparent that the resolution of the informational array pattern formed from the plurality of rows and taken in a direction parallel with medium second axis 28 will also be 300 dpi.

As described, light source 10 illustrated in FIGS. 1A and 1B and utilized in electrophotographic-type imaging stations of the prior art is operable to form an informational array pattern on the surface of a photosensitive medium wherein the resolution of the array pattern in a direction perpendicular to the direction of medium movement is identical to the resolution of the array pattern in a direction parallel with the direction of medium movement. This type of array pattern is referred to as having a symmetrical resolution.

Since the resolution of the informational array pattern formed on the surface of a photosensitive medium by prior art electrophotographic-type imaging stations is symmetrical, it is apparent that variations in array pattern gray scale are extremely difficult to achieve without effecting a reduction in the resolution of the array pattern in directions both parallel with and perpendicular to the direction of movement of the medium. With the imaging stations illustrated in FIGS. 1A and 1B, the preferred method for achieving desired gray scale is to divide the total number of individually addressable locations on the photosensitive medium in each row capable of having a dot of light energy 33 projected thereon by activation of light source 10 into a plurality of 4×4 matrices, each 4×4 matrix being referred to as a picture element (PEL). One such PEL is illustrated in FIG. 1C and designated by the numeral 38.

As seen in FIG. 1C, one PEL forming a 4×4 or B×B matrix 38 including sixteen dots of light energy 33 is illustrative of light source 10 projecting four consecutive dots 33 in portions of four consecutive rows 30 onto photosensitive medium 14 at sixteen individually addressable locations. As known in the art, forming a plurality of PELS 38 on the surface of photosensitive medium 14 representative of the desired informational array pattern wherein each individual location in each PEL has a dot of light energy thereon represents an informational array pattern having a gray scale of 100%. Stated in another manner, each individually addressable location in each PEL defining the informational array pattern is "on", i.e., a beam of light energy is projected onto each individually addressable location in each PEL.

From the above, it can be seen that utilizing four individually addressable locations in four consecutive rows 30 to form a single PEL 38 in order to achieve a desired informational array pattern gray scale reduces the resolution of each row 30 and the resolution of the array pattern in a direction parallel with medium first axis 26 from the original 300 dpi to 300/4=75 dpi. Similarly, since four columns 40 each containing four individually addressable locations form one PEL 38, the resolution of the informational array pattern in a direction parallel with medium second axis is also reduced from the original 300 dpi to 300/4=75 dpi.

As described, since the electrophotographic-type imaging stations of the prior art form an informational array pattern on the surface of a photosensitive medium having a resolution which is identical in directions both parallel with and perpendicular to the direction of medium movement, achieving a desired array pattern gray scale results in a loss in array pattern resolution along the mutually orthogonal axes of the array pattern by a factor determined by the size of one PEL.

Figure 1D:
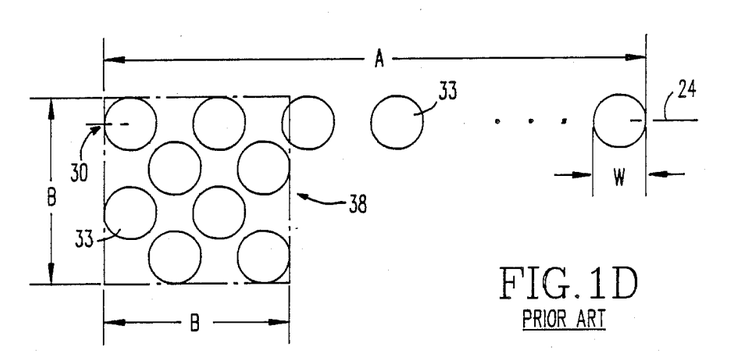
FIG. 1D illustrates the type of informational array pattern projected onto the surface of a photosensitive medium by a typical electrophotographic-type printer of the prior art to achieve 50% gray scale.
Figure 1E:
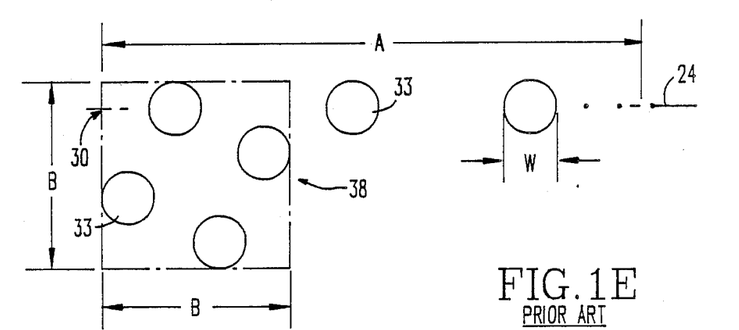
FIG. 1E illustrates the type of informational array pattern projected onto the surface of a photosensitive medium by a typical electrophotographic-type printer of the prior art to achieve 25% gray scale.

Now referring to FIGS. 1D and 1E, there are illustrated portions of informational array patterns capable of being formed by prior art electrophotographic-type imaging stations having gray scale values of 50% and 25%, respectively. As seen in FIG. 1D, achieving 50% gray scale is accomplished by projecting an individual dot of light energy 33 onto only eight of the sixteen available individually addressable locations in each PEL 38 (one PEL shown). In other words, 50% gray scale is achieved by projecting only one-half the total number of beams of light energy capable of being projected onto four consecutive individually addressable locations in portions of four consecutive rows 30 forming a PEL 38. As seen in FIG. 1D, PEL 38 forming a 4×4 or B×B matrix includes only eight or one-half of the dots 33 capable of being included in the matrix. As with the 100% gray scale informational array pattern of FIG. 1C, the 50% gray scale informational array patter of FIG. 1D also has a resolution of 75 dpi along array pattern mutually orthogonal axes parallel with medium first and second axes 26, 28, respectively.

Now referring to FIG. 1E, there is illustrated a portion of an informational array pattern capable of being formed by prior art electrophotographic-type imaging stations having a gray scale value of 25%. As seen in FIG. 1E, achieving 25% gray scale is accomplished by projecting an individual dot of light energy 33 onto only four of the sixteen available individually addressable locations in each PEL 38 (one shown). In other words, 25% gray scale is achieved by projecting only one-fourth the total number of beams of light energy capable of being projected onto four consecutive individually addressable locations in portions of four consecutive rows 30 forming a PEL 38. As seen in FIG. 1D, PEL 38 forming a 4×4 or B×B matrix includes only four or one-fourth the dots 33 capable of being included in the matrix. As with the 100% and 50% gray scale informational array patterns of FIGS. 1C and 1D, the 25% gray scale informational array pattern of FIG. 1E also has a resolution of 75 dpi along array pattern mutually orthogonal axes each parallel with medium first and second axes 26, 28, respectively. This is due to the fact that each beam of light energy projected by light source 10 onto the surface of the photosensitive medium produces a dot 33 having a generally circular cross-sectional configuration with a diameter W. As a result, the same number of dots of light energy are capable of being projected onto the photosensitive medium over the same distances measured along mutually orthogonal axes parallel with medium first and second axes 26, 28, respectively.

As described, the electrophotographic-type imaging stations of the prior art are capable of forming an informational array pattern on the surface of a photosensitive medium representative of a desired image or indicia. However, the shape of each dot of light energy in the array pattern necessarily results in an array pattern having identical resolutions in directions both parallel with and perpendicular to the direction of movement of the medium in proximity to the light source. As a result, achieving an array pattern of desired gray scale results in a loss of resolution in directions both parallel with and perpendicular to the direction of movement of the medium.

Figure 2A:
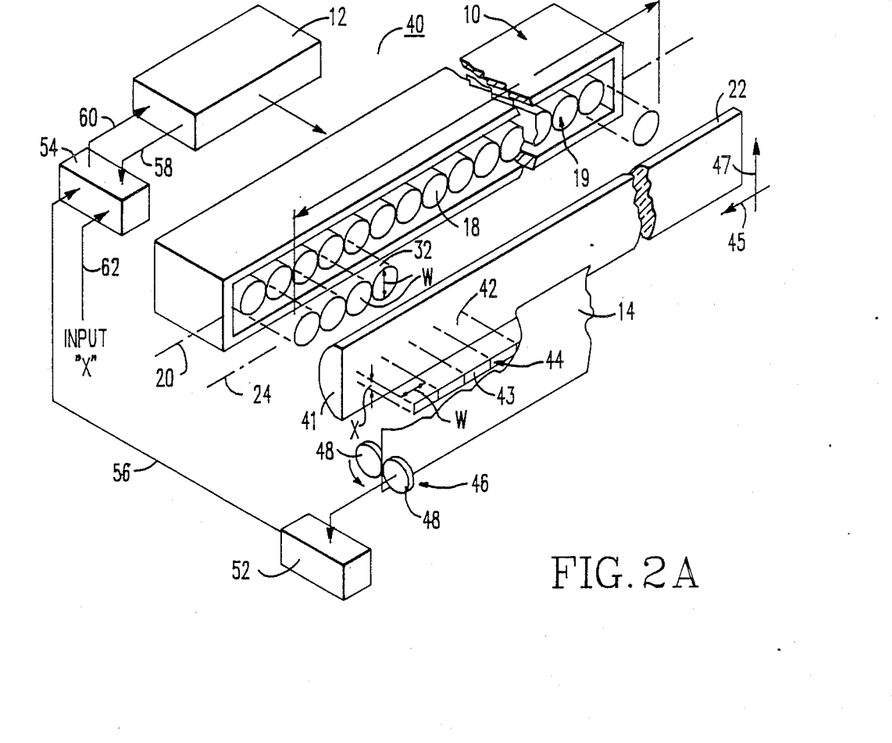
FIG. 2A is a perspective view of one form of the improved electrophotographic-type imaging station or printer which is the subject of the present invention.

Now referring to FIG. 2A, there is illustrated in perspective the electrophotographic-type imaging station 40 of the present invention which includes the light source 10 previously described with respect to FIG. 1A. Light source 10 includes an array 19 of individual light sources 18 in the form of light-emitting diodes 18 aligned along axis 20. Each of the diodes 18 in FIG. 2A is operable, upon receipt of an excitation signal from processor 12, to project a beam of light energy having a generally circular cross-sectional configuration in a direction towards the surface 22 of a photosensitive medium 14 in the form of a photosensitive paper material. For the sake of clarity, those components of imaging station 40 not necessary for an understanding of the invention have been omitted from FIG. 2A. It should be understood that although not shown, the omitted components are well known in the art of electrophotographic-type imaging stations.

Each of the diodes 18 is capable of projecting a generally circular cross-sectional beam of light energy along an axis 24 parallel with axis 20. Each beam is projected towards an individually addressable location on the surface 22 of photosensitive medium 14. An individually addressable location is defined herein as a location on the surface 22 of medium 14 onto which a single beam of light energy may project a dot. Thus, if light source 10 includes 300 individual diodes 18 aligned in an array, then surface 22 of photosensitive medium 14 will have 300 individually addressable locations thereon forming a row parallel with light source 10 axis 20.

As seen in FIG. 2A, an optical lens 41 is interposed between light source 10 and photosensitive medium 14. Optical lens 41 is a cylindrical lens, and operates to focus each generally circular cross-sectional beam of light energy projected by a diode 18 into a generally rectangular beam of light energy. For example, in FIG. 2A there are illustrated four generally circular cross-sectional beams of light energy illustrated schematically at 32 projected from four diodes 18 and positioned in side-by-side relationship. Each of the projected beams is passed through cylindrical lens 41 and focused thereby to form four generally rectangular beams of light energy 42 (one shown). Each of the beams 42 forms a rectangular dot 43 on the surface 22 of photosensitive medium 14 at an individually addressable location to form a row 44 of generally rectangular dots 43. As seen in FIG. 2A, row 44 of rectangular dots 43 lies along an axis parallel with photosensitive medium 14 first axis 45. As will be explained later in greater detail, medium first axis 45 is substantially perpendicular to the direction of movement of medium 14 past light source 10 during operation of imaging station 40. It should be understood that although only four generally rectangular cross-sectional beams of light energy 42 are illustrated in FIG. 2A, the actual number of rectangular beams of light energy capable of being focused by cylindrical lens 41 is a function of the total number of diodes 18 in the array.

In order to project a plurality of rows 44 of rectangular dots 43 onto the surface 22 of photosensitive medium 14 in row-at-a-time fashion, photosensitive medium 14 is moved relative to light source 10 via suitable paper drive means schematically illustrated at 46 in a direction parallel with medium second axis 47 and perpendicular to medium first axis 45. Paper drive means 46, illustrated in FIG. 2A as a pair of rollers 48, capable of moving a photosensitive medium such as photosensitive paper 14 in proximity to light source 10 are well known in the art of electrophotographic-type imaging stations. Paper drive means 46 is operable to move paper 14 past light source 10 at a substantially constant linear speed, and as will be explained later in greater detail, is coordinated with the actuation of the individual diodes 18 forming light source 10 to provide that consecutive rows 44 of rectangular dots 43 projected onto medium surface 22 in row-at-a-time fashion are in abutting relation with each other. That is, each of the individual rows projected onto paper 14 as paper 14 is moved at a substantially constant linear speed in proximity to source 19 abuts a previously projected row.

In order to insure that each of the projected rows of rectangular dots 43 abuts a previously projected row, the speed at which paper drive means 46 moves paper 14 in a direction parallel with medium second axis 47 is monitored by a speed controller schematically illustrated at 52. Speed controller 52 is itself known in the art, and includes internal circuitry for determining the speed of the photosensitive paper in a direction parallel with medium second axis 47 based on the measured angular or rotational speed of the individual rollers 48. The signal produced by controller 52 representative of the linear speed of the paper is provided to a controller 54 on line 56. As seen in FIG. 2A, processor 12 also provides a signal to controller 54 on line 58 which represents the rate at which each of the diodes 18 in light source 10 projects a generally circular cross-sectional beam of light energy 32 for focusing by cylindrical lens 41 to thereby form a single row 44 of rectangular dots 43 on paper 14. Within controller 54, the input signals received on lines 56 and 58 are processed by means well known in the art to generate a rate control signal provided as an output signal to the processor 12 on line 62 to adjust the energizing rate or addressing speed of each diode 18 in light source 10. The addressing speed is adjusted to provide that, for a given paper speed, each row 44 of generally rectangular beams 43 lies on an axis substantially parallel with medium 14 first axis 45.

The rate control signal also performs the function of providing that each projected row 44 of rectangular dots 43 abuts a previously projected row. As previously described, each beam of light energy 32 projected by light source 10 along axis 24 has a generally circular cross-sectional configuration with a diameter designated by the letter W. Due to the optical properties of cylindrical lens 41, it is seen that each generally circular cross-sectional beam of light energy 32 projected through lens 41 is focused thereby to form a generally rectangular dot 43 having a first cross-sectional axis W substantially identical in length to the length of the diameter or first cross-sectional axis W of the projected beam.

Also, each generally rectangular dot 43 has a second cross-sectional axis x which is reduced as a selected percentage of the length of the projected beam 32 second cross-sectional axis which is also of length W. Thus, each generally rectangular dot 43 has a first cross-sectional axis of length W substantially parallel with photosensitive medium 14 first axis 45 and a second cross-sectional axis x which is shorter in length than the length of cross-sectional axis W and substantially parallel with medium second axis 47.

As described, each individual generally circular cross-sectional beam of light energy 32 projected by light source 10 is focused by lens 41 into a generally rectangular beam of light energy 42 forming a rectangular dot 43 on photosensitive medium 14 having a first cross-sectional axis W substantially parallel with medium 14 first axis 45 and a second cross-sectional axis x which is substantially perpendicular to dot 43 first cross-sectional axis W and parallel with medium 14 second cross-sectional axis 47. It should be understood that the overall dimensions of each generally rectangular dot of light energy 43 may be varied depending upon the positioning of lens 41 between light source 10 and photosensitive medium 14 and the particular optical properties of the lens.

In order to insure that adjacent rows 42 of rectangular dots 43 abut each other, the desired value of x or the desired length of each rectangular dot 43 second cross-sectional axis is also provided as an input to controller 54 on line 62. Given the value x, controller 54 determines, in a manner known to those skilled in the art, the proper addressing speed of light source 10 for a predetermined photosensitive medium speed and provides the rate control signal representative of the proper addressing speed to processor 12 on line 60. The rate control signal is utilized within processor 12 via means known in the art to control the rate at which each diode in array 19 projects individual beams of light energy 32.

Providing that adjacent rows 44 of rectangular dots 43 of light energy are formed on the surface of medium 14 in abutting fashion is desirable in order to form an informational array pattern on the surface 22 of photosensitive medium 14 having a resolution pattern wherein the resolution of the pattern is greater in a direction parallel with the direction of medium movement than in a direction perpendicular thereto. As will be explained later in greater detail, this type of resolution pattern allows a desired array pattern gray scale to be achieved without a loss in original array pattern resolution in a direction perpendicular to the direction of movement of the medium. The resolution pattern of the informational array pattern projected by the electrophotographic-type imaging station of the present invention is formed as described above since each generally rectangular dot 43 of light energy in each row 44 has a first cross-sectional axis W which is greater in length than the dot second cross-sectional axis x. Thus, if light source 10 includes, for example, 300 individual diodes 18 over a length A, and A=1 inch, then the maximum number of rectangular dots 43 each having a first cross-sectional axis of length W capable of being projected along a single row is 300, and the resolution of the one inch long row is 300 dpi in a direction parallel with medium first axis 45. However, since the length of each dot 43 second cross-sectional axis x is less than the length W, it is apparent that, measured in a direction parallel with medium second axis 47, a number of rows 44 greater than 300 may be projected in row-at-a-time fashion onto medium 14 surface 22 over the same length A=1 inch. As a result, an informational array pattern is formed on photosensitive medium 14 wherein the resolution of the array pattern is greater in a direction parallel with medium second axis 47 than in a direction parallel with medium first axis 45.

Figure 2B:
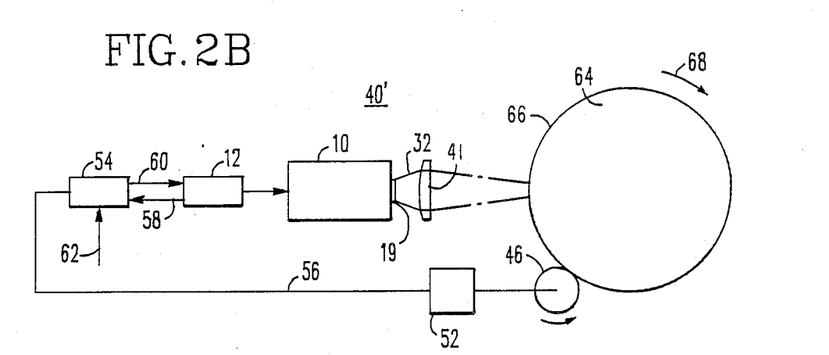
FIG. 2B is a schematic illustration of an alternate embodiment of the electrophotographic-type imaging station or printer which is the subject of the present invention.

Now referring to FIG. 2B, there is schematically illustrated the light source 10, optical lens 41, and the various controllers 52, 54 and processor 12 previously described with respect to FIG. 2A. The assemblage of components illustrated in FIG. 2B forms an alternate embodiment of the electrophotographic-type imaging station of the present invention designated by the numeral 40'. As seen in FIG. 2B, the photosensitive medium 14 in the form of photosensitive paper material has been replaced with a rotating drum 64 having a photoreceptive coating 66 thereon. The operation of electrostatically charged drum 64 including a coating of photoreceptor thereon as a standard component of an electrophotographic-type imaging station has been previously described with respect to FIG. 1B and will not be repeated. However, it should be understood that as drum 64 rotates angularly in a direction indicated by the directional arrow 68 at a substantially constant angular speed, lens 41 focuses each generally circular beam of light energy 32 projected by light source 10 into a generally rectangular beam for projection onto the photoreceptor 66. As known in the art, each generally rectangular dot of light energy projected onto the surface of the photoreceptor discharges the electrostatic charge at that individually addressable location and allows a toner to adhere to the photoreceptor at that location. Thus, an informational array pattern formed from a plurality of rows 44 of rectangular dots 43 having the resolution pattern previously described is capable of being formed on the surface of the photoreceptor.

As described in FIGS. 2A and 2B, an optical lens such as a cylindrical lens may be utilized in conjunction with a conventional light source in an electrophotographic-type imaging station or printer to convert the generally circular cross-sectional beams of light energy projected by the source into rows each comprised of generally rectangular beams. By coordinating the rate at which the photosensitive medium, either in the form of a photosensitive paper or photoreceptor coated on a rotating drum, is moved in proximity to the light source and the activation of the light source, a plurality of rows of rectangular dots of light energy may be projected in row-at-a-time, abutting fashion onto the surface of the medium.

Figure 3:
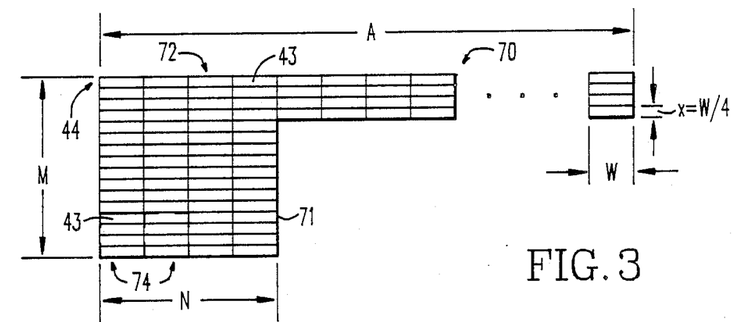
FIG. 3 illustrates the informational array pattern projected onto a photosensitive medium by the electrophotographic-type imaging station of the present invention to achieve 100% gray scale.

Referring now to FIG. 3, there is illustrated a portion of the type of informational array pattern which may be formed on the surface of a photosensitive medium such as photosensitive paper 14 or photoreceptor 66 utilizing the imaging station of the present invention. As seen in FIG. 3, informational array pattern 70 includes four rows 44 of generally rectangular dots 43 each spanning a length A. As previously described, if A equals one inch and light source 10 includes 300 diodes 18 over the same length, then it is apparent that each row 44 is capable of including a maximum of 300 individual dots 43 per inch. It should be understood that it is not a requirement that each row 44 actually includes 300 rectangular dots 43. As known in the art, the number of rectangular dots actually forming a portion of a particular row is dependent upon the image or indicia formed on the surface of the photosensitive medium.

As seen in FIG. 3, each generally rectangular dot 43 has a first cross-sectional axis of length W which is substantially parallel with the first axis 45 of the photosensitive medium and a second cross-sectional axis x which is substantially parallel with the second axis 47 of the photosensitive medium. As previously described, W is greater in length than x to provide that each dot 43 has a rectangular configuration. As a result, it is apparent that if each row 44 is capable of including a maximum of 300 rectangular dots 43 over a distance of one inch, then a total number of rows greater than 300 will be projected over a distance of one inch. Further, by adjusting the value x to as small a dimension as possible, the total number of rows 44 capable of being projected over one inch will be maximized.

As described, by projecting a plurality of rows of generally circular cross-sectional beams of light energy, focusing each projected row into a row of generally rectangular beams of light energy and coordinating the activation of the light source and the movement of the photosensitive medium so that adjacent rows of rectangular beams abut each other, an informational array pattern may be formed on the surface of the photosensitive medium having a resolution in a direction parallel with the direction of movement of the medium which is greater than the resolution in a direction perpendicular thereto.

The resolution of the array pattern formed by the imaging station of the present invention is divisible into two components; a resolution measured in a direction parallel with the plurality of rows 44 of generally rectangular dots 43 and a resolution measured in a direction perpendicular to the plurality of rows. This is best understood by an examination of a portion of the informational array pattern 70 which forms an N×M matrix generally designated by the numeral 71. As seen, N×M matrix 71 includes four columns 72 of sixteen rectangular dots 43. Since N×M matrix 71 includes four columns 72 of sixteen dots 43, the resolution of the N×M matrix itself is four in a direction parallel with N and sixteen in a direction parallel with M. The matrix is not perfectly symmetrical since each dot 43 has a first cross-sectional axis of length W and a second cross-sectional axis of length x, and x < W. It should be understood that second cross-sectional axis x is defined as having a length of W/4 in FIG. 3 for example purposes only and the actual length of x may be varied by adjusting the spacing between cylindrical lens 41 and light source 10 or the optical properties of the lens itself.

A benefit achieved from forming an informational array pattern 70 on the surface of the photosensitive medium which is not perfectly symmetrical in terms of both structure and resolution pattern is that the gray scale of the informational array pattern may be varied without experiencing a loss in the original resolution of the array pattern in a direction N parallel with the plurality of rows 44, or as previously described in FIG. 2A, in a direction parallel with medium first axis 45.

As previously described, array pattern 70 is formed from a plurality of matrices 71 each including four columns 72 of sixteen individual rectangular dots 43. Each rectangular dot 43 has, for example, a first axis of length W which is four times greater in length than the length of second axis x. Since each rectangular dot 43 is formed by focusing one generally circular cross-sectional beam of light energy, and each circular beam has first and second cross-sectional axes each of length W, it is apparent that each matrix 71 may be divided into a plurality of subcells 74 each formed from four generally rectangular dots, and the lengths of both the first and second cross-sectional axes of each subcell is identical to the lengths of the first and second cross-sectional axes of a single circular cross-sectional beam. Thus, by focusing each beam projected from the light source into a rectangular beam, four rectangular beams forming a single subcell have the same overall dimensions as a single projected beam.

If it is desired to form an informational array pattern having a gray scale of 100%, then light source 10 is operated to provide that, after focusing, four rectangular dots 43 are included in each subcell 74 in each matrix in the array pattern. In other words, each individually addressable location in the plurality of N×M matrices in the array pattern has a focused rectangular dot projected thereon. Projecting a rectangular dot 43 onto each individually addressable location in the plurality of N×M matrices in the array provides total illumination of the array pattern and results in the achievement of 100% gray scale.

Figure 4:
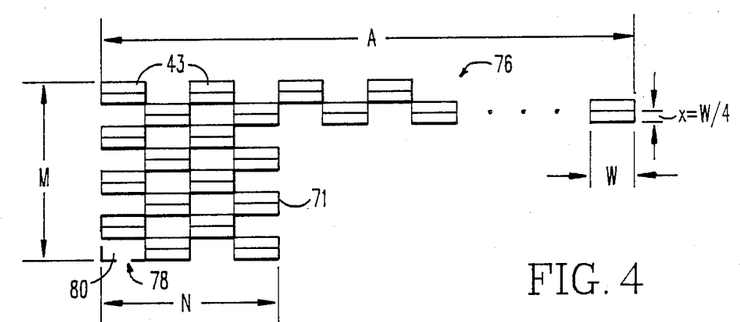
FIG. 4 illustrates the informational array pattern projected onto a photosensitive medium by the electrophotographic-type imaging station of the present invention to achieve 50% gray scale.

If it is desired to form a 50% gray scale informational array pattern, then an informational array pattern 76 (only a portion shown) such as illustrated in FIG. 4 may be projected onto the surface of a photosensitive medium such as photosensitive paper 14 or photoreceptor 66. As seen in FIG. 4, there is illustrated the N×M matrix 71 previously described with respect to FIG. 3 which forms a portion of pattern 76. However, each subcell 78 in N×M matrix 76 includes two generally rectangular dots 43. Each subcell 78 also includes a void 80 having an overall dimension equal to the overall dimension of two rectangular dots 43. Since each subcell 78 in the N×M matrix includes only two of the four rectangular dots 43 capable of being projected therein, subcell 78 has a gray scale of 50%. Since each of the sixteen subcells 78 in N×M matrix 71 includes only two of the four possible rectangular dots therein, the N×M matrix itself and therefore the informational array pattern has a gray scale of 50%.

The benefit derived from forming the informational array patterns 70 or 76 as illustrated in FIGS. 3 and 4 is that since the total number of rectangular dots 43 in each subcell determines the gray scale of the array pattern, and each subcell includes only one dot 43 from each row, the desired gray scale of the array pattern may be selected without a loss in the original resolution of the array pattern in a direction parallel with each of the rows 44, or in a direction parallel with the medium first axis 45.

Figure 5:
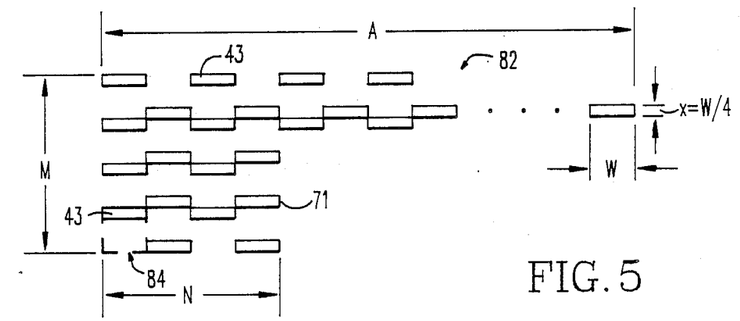
FIG. 5 illustrates the informational array pattern projected onto a photosensitive medium by the electrophotographic-type imaging station of the present invention to achieve 25% gray scale.

Now referring to FIG. 5 there is illustrated a portion of an array pattern 82 which may be formed on the surface of a photosensitive medium such as photosensitive paper 14 or photoreceptor 66 which has a gray scale of 25%. Informational array pattern 82 includes the plurality of N×M matrices 71 (one shown) previously described. However, as seen in FIG. 5, each subcell 84 includes only one rectangular dot 43 out of a possible four dots. Thus, the gray scale of each matrix and the gray scale of the array pattern is 25%.

It should be pointed out that although FIGS. 3-5 illustrate each matrix as including sixteen subcells and each subcell as including a maximum of four individually addressable locations therein for receiving a rectangular dot, these specific numbers were selected for illustrative purposes only. The overall size of each N×M matrix may be varied along with the total number of individual rectangular dots in each subcell. As previously stated, although the electrophotographic-type imaging station or printer of the present invention has been described herein as utilizing a light source formed from a plurality of individual light emitting diodes, other types of imaging systems such as a laser source or liquid crustal shutter system may be utilized if desired. If a laser source is utilized, then the focusing lens is positioned between the laser source and the photosensitive medium. If a liquid crystal shutter system is utilized, then the focusing lens is positioned between the array of liquid crystal shutters and the photosensitive medium.

Although the present invention has been described in terms of what are at present believed to be its preferred embodiments, it will be apparent to those skilled in the art that various changes may be made without departing from the scope of the invention. It is therefore intended that the appended claims cover such changes.

We claim:

1. An electrophotographic-type imaging station for producing an informational array pattern of enhanced resolution on the surface of a photosensitive medium, comprising:

a photosensitive medium having a mutually orthogonal first and second axes;

light radiation means spaced from said photosensitive medium, said light radiation means being capable of projecting a preselected number of beams of light energy along generally linear paths defining a row substantially parallel with said medium first axis, each projected beam having a preselected cross-sectional configuration with mutually orthogonal first and second cross-sectional axes;

said light radiation means being capable of projecting each said beam of light energy in a direction towards an individually addressable location on said medium so that each said beam first and second cross-sectional axes are substantially parallel with said medium first and second axes, respectively;

focusing means interposed between said photosensitive medium and said light radiation means, said focusing means focusing each said preselected cross-section beam projected along said row and towards an individually addressable location on said photosensitive medium to a generally rectangular beam of light energy;

each said rectangular beam having a first cross-sectional axis substantially identical in length to the length of said first cross-sectional axis of said projected beam and a second cross-sectional axis reduced as a selected percentage of the length of said projected beam second cross-sectional axis, said rectangular beam first cross-sectional axis being greater in length than said rectangular beam second cross-sectional axis;

means for moving said photosensitive medium relative to said light radiation means in a direction substantially parallel with said medium second axis;

means for coordinating the activation of said light radiation means and said means for moving said photosensitive medium so that an informational array pattern formed from a plurality of rows of generally rectangular beams is focused in row-at-a-time, abutting fashion onto said photosensitive medium;

said informational array pattern forming an N×M matrix wherein the value N corresponds to the total number of said individually addressable locations in a preselected length of a given row onto which said rectangular beams of light energy may be projected, and the value M corresponds to the total number of rows of rectangular beams of light energy capable of being projected over the same preselected length measured in a direction parallel with said medium second axis;

the value N defining the resolution of said informational array pattern in a direction parallel with said medium first axis and the value M defining the resolution of said informational array pattern in a direction parallel with said medium second axis; and said resolution in said direction parallel with said medium second axis being greater than said resolution in said direction parallel with said medium first axis.

2. The electrophotographic-type imaging station of claim 1, wherein;

each said individually addressable location in each said row of said informational array pattern is addressed by projecting a rectangular beam of light energy thereon; and the total number of individually addressable locations in each said row actually addressed defines a desired gray scale of said informational array pattern.

3. The electrophotographic-type imaging station of claim 1, wherein:

each said beam of light energy projected by said light radiation means in each said row has a generally circular cross-sectional configuration;

said light radiation means is operatively connected with control means operable to control the rate at which each said row of said generally circular cross-sectional beams is projected by said light radiation means; and the operation of said control means and the operation of said means for moving said photosensitive medium are coordinated to provide that each said row of generally circular cross-sectional beams focused by said focusing means to a row of generally rectangular beams and projected onto a row of individually addressable locations on said photosensitive medium abuts an adjacent row of generally rectangular beams.

4. The electrophotographic-type imaging station of claim 1, wherein:

said photosensitive medium is formed from a photosensitive paper material.

5. The electrophotographic-type imaging station of claim 1, wherein:
said photosensitive medium is formed from a photoreceptor coated on an electrostatically charged drum.

6. The electrophotographic-type imaging station of claim 1, wherein:
said focusing means is formed from a cylindrical lens.

7. A method for producing an informational array pattern of enhanced resolution on the surface of a photosensitive medium, comprising the steps of:
providing a photosensitive medium having mutually orthogonal first and second axes;
positioning light radiation means a preselected distance from said photosensitive medium, said light radiation means being capable of projecting a linear array of beams of light energy along generally linear paths defining a row towards individually addressable locations on a surface of said photosensitive medium, each said beam having a preselected cross-sectional configuration with mutually orthogonal first and second cross-sectional axes;
positioning said light radiation means relative to said photosensitive medium so that said linear array of projected beams forming said row and said first cross-sectional axis of each said beam in said row are substantially parallel with said medium first axis;
focusing each said projected beam forming said row into a beam of light energy having a generally rectangular cross-sectional configuration, each said focused beam having a first cross-sectional axis substantially identical in length to the length of said projected beam first cross-sectional axis and a second cross-sectional axis reduced as a percentage of the length of said projected beam second cross-sectional axis;
moving said photosensitive medium relative to said light radiation means in a direction substantially parallel with said medium second axis;
coordinating said movement of said photosensitive medium and the activation of said light radiation means so that an informational array pattern formed from a plurality of abutting rows of generally rectangular beams is focused in row-at-a-time fashion onto said surface of said photosensitive medium; and
forming said informational array pattern on said so as to produce an N×M matrix wherein the value N corresponds to the total number of individually addressable locations in a preselected length of a given row onto which said rectangular beams may be projected and the value M corresponds to the total number of rows of rectangular beams capable of being projected over the same preselected length measured in a direction parallel with said medium second axis; and wherein the value N defines a resolution of said array pattern in a direction parallel with said medium first axis and the value M defines the second resolution of said array pattern in a direction parallel to said medium second axis.

8. The method of claim 7, which includes:
forming said informational array pattern on said surface of said photosensitive medium such that said resolution of said array pattern in said direction parallel with said medium first axis is less than said resolution of said array pattern in said direction parallel with said medium second axis.

9. The method of claim 7, which includes:
addressing each said individually addressable location in each said row of said informational array pattern by projecting a rectangular beam of light energy thereon, the total number of individually addressable locations in each said row actually addressed defining a desired gray scale of said pattern.

10. The method of claim 7, which includes:
projecting a linear array of generally circular cross-sectional beams of light energy in each said row;
controlling the rate at which each said row of generally circular cross-sectional beams is projected; and
coordinating said rate at which each said row is projected and said movement of said photosensitive medium to provide that each said row of generally circular cross-sectional beams focused by said focusing means to a row of generally rectangular beams and projected onto a row of individually addressable locations on said photosensitive medium abuts an adjacent row of generally rectangular beams.

11. The method of claim 7, which further includes:
forming said photosensitive medium from a photosensitive paper material.

12. The method of claim 7, which further includes:
forming said photosensitive medium from a photoreceptor coated on an electrostatically charged drum.

13. The method of claim 7, which includes:
positioning a cylindrical lens between said light radiation means and said photosensitive medium for focusing each said beam of light energy projected by said light radiation means to a generally rectangular beam.

14. An electrophotographic-type imaging station for producing an informational array pattern of enhanced resolution on the surface of a photosensitive medium, comprising:
light radiation means, said light radiation means being capable of projecting a preselected number of beams of light energy along generally linear paths defining a row, each projected beam having a preselected cross-sectional configuration with mutually orthogonal first and second cross-sectional axes;
said light radiation means adapted to be spaced a preselected distance from a photosensitive medium having mutually orthogonal first and second axes and moved in proximity to said light radiation means;
said light radiation means being capable of projecting each said beam of light energy in a direction towards an individually addressable location on said medium so that each said beam first and second cross-sectional axes are substantially parallel with said medium first and second axes, respectively;
focusing means spaced from said light radiation means and positioned to lie in interposed relationship between said light radiation means and said photosensitive medium as said photosensitive medium is moved in proximity to said light radiation means;
said focusing means focusing each said preselected cross-section beam projected along said row and towards an individually addressable location on said photosensitive medium to a generally rectangular beam of light energy;

each said rectangular beam having a first cross-sectional axis substantially identical in length to the length of said first cross-sectional axis of said projected beam and a second cross-sectional axis reduced as a selected percentage of the length of said projected beam second cross-sectional axis, said rectangular beam first cross-sectional axis being greater in length than said rectangular beam second cross-sectional axis;

means operable to move said photosensitive medium relative to said light radiation means in a direction substantially parallel with said medium second axis;

means for coordinating the activation of said light radiation means and said means for moving said photosensitive medium so that an informational array pattern formed from a plurality of rows of generally rectangular beams is focused in row-at-a-time, abutting fashion onto said photosensitive medium;

said informational array pattern forming an $N \times M$ matrix wherein the value N corresponds to the total number of said individually addressable locations in a preselected length of a given row onto which said rectangular beams of light energy may be projected, and the value M corresponds to the total number of rows of rectangular beams of light energy capable of being projected over the same preselected length measured in a direction parallel with said medium second axis;

the value N defining the resolution of said informational array pattern in a direction parallel with said medium first axis and the value M defining the resolution of said informational array pattern in a direction parallel with said medium second axis; and said resolution in said direction parallel with said medium second axis being greater than said resolution in said direction parallel with said medium first axis.

15. The electrophotographic-type imaging station of claim 14, wherein:

each said individually addressable location in each said row of said informational array pattern is addressed by projecting a rectangular beam of light energy thereon; and the total number of individually addressable locations in each said row actually addressed defines a desired gray scale of said informational array pattern.

* * * * *